(12) United States Patent
Merched et al.

(10) Patent No.: US 7,940,864 B2
(45) Date of Patent: May 10, 2011

(54) CHANNEL ESTIMATION FOR HIGH DOPPLER MOBILE ENVIRONMENTS

(75) Inventors: Ricardo Merched, Rio de Janeiro (BR); Nabil Yousef, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 546 days.

(21) Appl. No.: 12/110,637

(22) Filed: Apr. 28, 2008

(65) Prior Publication Data

US 2009/0268803 A1  Oct. 29, 2009

(51) Int. Cl.
*H04L 27/00* (2006.01)
(52) U.S. Cl. ........................................ 375/316
(58) Field of Classification Search .............. 375/259, 375/316, 324, 240.18; 379/387.02, 406.13; 324/607; 341/126, 127, 128, 155, 156, 159; 342/196; 708/404, 405; 370/210
See application file for complete search history.

(56) References Cited

U.S. PATENT DOCUMENTS

| 7,792,219 B2* | 9/2010 | Lee et al. ................. 375/316 |
| 2007/0036239 A1* | 2/2007 | Ma et al. ................. 375/316 |
| 2007/0160159 A1* | 7/2007 | Song et al. ............... 375/260 |
| 2008/0219371 A1* | 9/2008 | Hong et al. .............. 375/260 |

\* cited by examiner

*Primary Examiner* — Sam K Ahn
(74) *Attorney, Agent, or Firm* — Rahman LLC

(57) ABSTRACT

An apparatus and method of applying a fast algorithm to a pilot-based channel estimation process includes receiving, in a receiver, a signal comprising information bits transmitted in a wireless channel, executing a pilot-based channel estimation process running on a decision-directed turbo estimation procedure having a p structure for a vector of pilots and an upper bound N for a channel spread based on a feedback of detected information bits via OFDM, encoding the detected information bits, re-encoding the detected information bits at a decoder output, re-constructing and subtracting an ICI term from the received signal, modulating the detected information bits, estimating channel symbols in a per-carrier basis based on a diagonal matrix of a full matrix involved in the pilot-based channel estimation, and performing training of the wireless channel based on an entire vector of the channel symbols.

20 Claims, 8 Drawing Sheets

US 7,940,864 B2

CHANNEL ESTIMATION FOR HIGH DOPPLER MOBILE ENVIRONMENTS

BACKGROUND

1. Technical Field

The embodiments herein generally relate to channel estimation, and, more particularly to channel estimation for high Doppler mobile environments.

2. Description of the Related Art

High Doppler effects resulting from fast time varying dispersive channels represent the most critical impairment to channel estimation techniques in block transmissions. In multicarrier systems, it gives rise to the so-called intercarrier interference (ICI), whose modeling for correct data recovery is paramount. One of the current most challenging topics in wireless communications consists in the accurate modeling and implementation of channel estimation and symbol estimation methods for fast varying mobile channels. In such high Doppler environments, the channel variation within the transmitted block is so rapid, that the common notion of channel estimation no longer exists, and conventional linear estimation techniques do not apply.

In the case of orthogonal-frequency-division-multiplexing (OFDM) systems, the corresponding high Doppler frequency is translated into the so-called ICI, whose effect is to terminate the simplicity of estimation in cyclic prefix based schemes. One possible way to tackle the ICI problem is to capture, up to a certain extent, the channel variation within the OFDM block via a Taylor expansion of the exponential coefficients that correspond to a Jake's model approximation of a Rayleigh fading channel. The basic idea behind this approach is to consider the channel vector as a random quantity, in a way that all the channel derivatives can be cast into a linear model, suitable for estimation.

In approximate solutions that rely on both linear and decision directed estimation schemes, the approach leads to several open issues in terms of performance and feasibility of implementation, especially for digital video broadcasting (DVB) applications. The exact minimum mean-square-error (MMSE) channel parameters estimator possesses a matrix structure that becomes highly ill-conditioned, especially in DVB applications, exhibiting a condition number that grows with the ICI model order, and due to numerical problems, the structure of the estimator can lead to meaningless results.

Also, when estimating the channel parameters for the first time within a given OFDM block, training information is very limited. In this case, the type of receiver architecture (e.g., linear MMSE or decision-directed) can considerably affect the quality of the detected symbol, so that further channel and symbol estimations become compromised. Also, the algorithm employed in both channel and symbol estimation steps must have low complexity; i.e., it is usually desired that the underlying method makes use of the Discrete Fourier Transform (DFT) efficiency, or perhaps of the corresponding induced a Toeplitz or a circulant structure of the channel model. For instance, a MMSE receiver would require a matrix inversion whose complexity is prohibited. Preserving optimality and simultaneously implementing via a fast algorithm is a challenging task.

SUMMARY

In view of the foregoing, an embodiment herein provides a method of applying a fast algorithm to a pilot-based channel estimation process and a program storage device readable by computer, tangibly embodying a program of instructions executable by the computer to perform a method of applying a fast algorithm to a channel estimation process, wherein the method includes receiving, in a receiver, a signal comprising information bits transmitted in a wireless channel, executing a pilot-based channel estimation process running on a decision-directed turbo estimation procedure having a p structure for a vector of pilots and an upper bound N for a channel spread based on a feedback of detected information bits via OFDM, encoding the detected information bits, re-encoding the detected information bits at a decoder output, re-constructing and subtracting an ICI term from the received signal, modulating the detected information bits, estimating channel symbols in a per-carrier basis based on a diagonal matrix of a full matrix involved in the pilot-based channel estimation, and performing training of the wireless channel based on an entire vector of the channel symbols.

The channel symbols may be re-estimated based on a correct symbol decision. An effective noise of the received signal may be approximated based on a channel noise if a channel estimation error is small after a first iteration of the turbo estimation procedure. A recursive estimate of the total noise power of a noise source may be computed. The noise source includes at least one of a quantization noise source and a model imperfection noise source affecting the received signal. The first iteration of the turbo estimation procedure and the effective noise of the received signal are based on the channel noise. The ICI term may be reconstructed through a pilot vector. The receiver includes any of a block linear minimum mean-square-error (MMSE) and a block MMSE Decision Feedback Equalizer (DFE) receiver.

In yet another aspect, an apparatus for applying a fast algorithm to a channel estimation process includes a receiver that receives a signal comprising information bits transmitted in a wireless channel, a memory unit operatively connected to the receiver and comprising a programmable set of instructions, a display unit operatively connected to the memory unit, a processor that executes the set of instructions, a Viterbi decoder operatively connected to the processor, an encoder that encodes the detected information bits and re-encodes the detected information bits at an output of the Viterbi decoder, and a modulator that modulates the detected information bits.

The processor executes a pilot-based channel estimation process running on a decision-directed turbo estimation procedure having a p structure for a vector of pilots and an upper bound N for a channel spread based on a feedback of detected information bits via OFDM. The processor (i) re-constructs and subtracts an IC) term from the received signal; (ii) estimates channel symbols in a per-carrier basis based on a diagonal matrix of a full matrix involved in the pilot-based channel estimation; and (iii) performs training of the wireless channel based on an entire vector of the channel symbols.

In addition, the processor re-estimates the channel symbols based on a correct symbol decision, and approximating an effective noise of the received signal based on a channel noise if a channel estimation error is small after a first iteration of the turbo estimation procedure. The processor computes a recursive estimate of the total noise power of a noise source. The noise source includes at least one of a quantization noise source and a model imperfection noise source affecting the received signal. The first iteration of the turbo estimation procedure and the effective noise of the received signal are based on the channel noise. The processor reconstructs the ICI term through a pilot vector. The receiver includes any of a block linear MMSE and a block MMSE DFE receiver.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
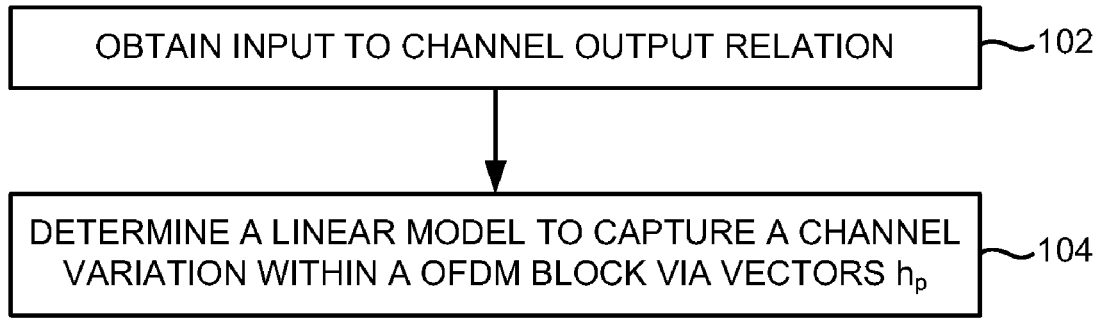
FIG. 1 illustrates a method of determining a linear model based on an ICI modeling according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a method of applying a fast algorithm to a pilot-based channel estimation process. The method includes receiving, in a receiver, a signal comprising information bits transmitted in a wireless channel, executing a pilot-based channel estimation process running on a decision-directed turbo estimation procedure having a p structure for a vector of pilots and an upper bound N for a channel spread based on a feedback of detected information bits via OFDM, encoding the detected information bits, re-encoding the detected information bits at a decoder output, re-constructing and subtracting an ICI term from the received signal, modulating the detected information bits, estimating channel symbols in a per-carrier basis based on a diagonal matrix of a full matrix involved in the pilot-based channel estimation, and performing training of the wireless channel based on an entire vector of the channel symbols. Referring now to the drawings, and more particularly to FIGS. 1 through 8B, where similar reference characters denote corresponding features consistently throughout the figures, there are shown preferred embodiments.

FIG. 1 illustrates a method of determining a linear model based on ICI modeling. A discrete linear time invariant (LTI) single-input-single-output (SISO) channel of length N, described via a P×P pseudocirculant matrix $H(z) \triangleq H_0 + H_1 z^{-1}$ is considered, where P=N+M−1 is the minimum length required for the transmission block. The interblock interference (IBI) caused by the term in $H_1$ is assumed to be previously removed according to zero padding (ZP) or a leading zeros (LZ) scheme. For consistency, a circulant convolution model is further assumed to be induced either in a overlap-and-save (from LZ) or in an overlap-and-add (from ZP).

Let s and t be the M×1 information and pilot vectors at a time instant i, transmitted in non-overlapping subcarriers. In step 102, the time index is not represented for simplicity and thus the transmitted vector can be written as x=F*(t+s) so that the input to channel output relation is expressed as:

$$y = CF^*(t+s) + v. \qquad (1)$$

Now in the case of multipath mobile environments, the impulse response of the channel is time varying and the circulant model no longer holds. Moreover, due to the mobile velocity, it is common to assume that the l-th channel path undergoes a Doppler shift $f_l = f_d \cos\theta_l$, where $f_d$ corresponds to the maximum Doppler shift arriving at zero angle of incidence, so that the m-th channel tap seen from the kth DFT output $y'_i = F^* y$ is denoted by $h_k(m-1)e^{j2\pi f_{m-1}(k-\delta)T_s}$, k=0, 1, ..., M−1, where $T_s = 1/f_s$ is the sampling period. The parameter δ reflects a reconstruction delay introduced in the output DFT, and serves the purpose of minimizing the magnitude of the time-varying channel fluctuations within the OFDM block. In step 104, by virtue of a Taylor expansion of these exponentials, it is verified that a linear model is determined and can be used to capture the channel variation within the OFDM block via the vectors $h_p$ as:

$$y' = \sqrt{M} \sum_{p=0}^{\infty} FD^p F^* \Delta_x \overline{F} h_p + v' \qquad (2)$$

where $D = \text{diag}\{-\delta/M, \ldots, \delta/M\}$, and the m-th element of $h_p$ is given by: $h(m-1)e^{j2\pi f_{m-1} T_s}(j2\pi f_{m-1}/f_s)^p/p!$. The term channel estimation is used, when referring to the estimation of the vectors of derivatives $h_p$.

Figure 2:
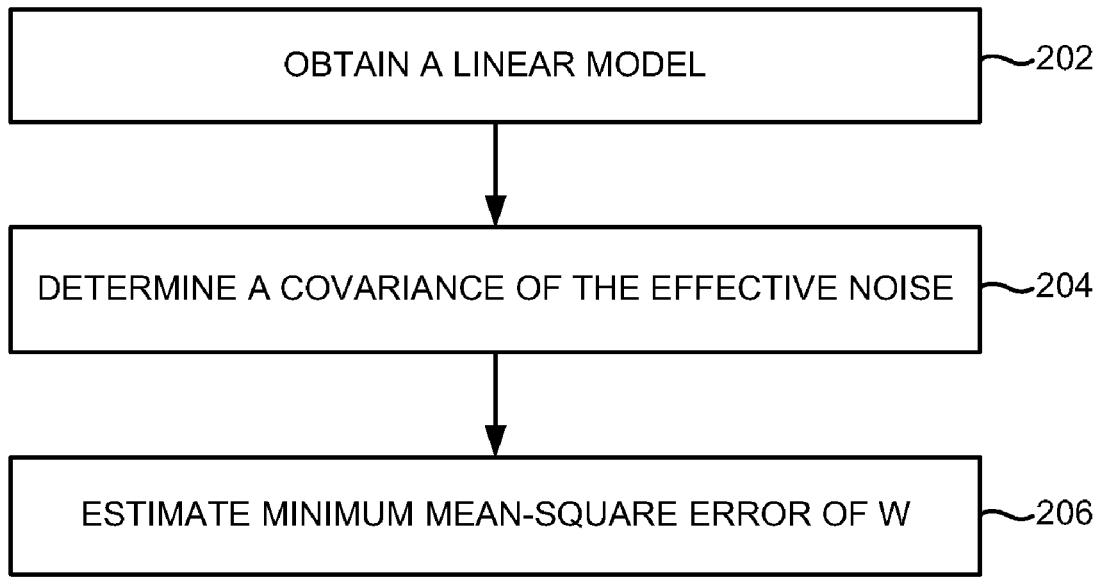
FIG. 2 illustrates a method of estimating a Minimum Mean-Square Error channel based on a higher order model for ICI according to an embodiment herein.

FIG. 2 illustrates a method of estimating a MMSE channel based on a higher order model for ICI. In step 202, with reference to FIG. 1, during the first channel estimation, the vectors $h_p$ is recovered based on the pilot vectors only, so that linear model in (2) is determined and written as:

$$y' = \underbrace{\sqrt{M} [\Delta_t \overline{F} \ FDF^* \Delta_t \overline{F}]}_{U_0} \underbrace{\begin{bmatrix} h_0 \\ h_1 \end{bmatrix}}_{w_0} + n, \qquad (3)$$

where $n \triangleq (\Lambda_0 + FDF^*\Lambda_1)s + v'$ is the effective noise that includes the unknown data. Because the channel parameter in a turbo estimation is to be obtained and improved, the first channel and symbol estimates are crucial for further improvement and symbol decoding. Moreover, depending on the estimation method employed, it is important to fully characterize the statistics of the noise term n, especially because initially the data vector s is a stochastic quantity.

The statistics of the noise can be relevant if used by other blocks of the underlying communication system, when decoding the transmitted bits. In step 204, a covariance of this effective noise is determined and is given by:

$$R_n = N\sigma_s^2 \sigma_{h_0}^2 \bar{I}_s + \sigma_v^2 I + N\sigma_s^2 \sigma_{h_1}^2 FDF^* \bar{I}_s FDF^*, \quad (4)$$

where $\bar{I}_s$ is the diagonal matrix with ones at the data indexed diagonal entries, and zeros. For instance, a soft-demapper, which is employed, can be shown to result in large improvements in terms of coding gain for the Viterbi decoder. There are a few difficulties intrinsic to the optimal estimator that is based on the above linear model for the ICI, not only due complexity issues, but also to numerical problems related to the model. Let * denote the complex conjugate transposition operator. In step 206, the MMSE (Minimum Mean Square Error) estimate of w is determined and given by:

$$\hat{w}_0 = (R_w^{-1} + U_0^* R_n^{-1} U_0)^{-1} U_0^* R_n^{-1} y = P_0 U_0^* R_n^{-1} y', \quad (5)$$

where $\hat{w}_0 \stackrel{\Delta}{=} [\hat{h}_{0,0}{}^* \hat{h}_{1,0}{}^*]^*$, with corresponding estimation error covariance given by $P_0 = (R_w^{-1} + U_0^* R_n^{-1} U_0)^{-1}$. Now, the Doppler effect induces a structure in $U_0$ such that $P_0$ becomes highly ill conditioned.

It can be verified that a typical transmission results in a condition number that grows with the order or the ICI model. Moreover even though the regularization term in the MMSE estimator of equation (5) improves conditioning, the latter becomes highly dependent on the second order statistics assumed for the channel, which is inversely proportional to the amount of regularization. Thus, the slightest imperfection in the model, or quantization error, is translated into a noise amplification effect that can destroy the very purpose of the estimator. The condition number of $(R_w^{-1} + U_0^* R_n^{-1} U_0)$ is computed for ICI model orders Q=1,2,3, assuming for simplicity an effective noise variance given by $R_n = \sigma_e^2 I$. By varying the effective signal-to-noise ratio (SNR) (regularization) for P=1,2, for high SNR, numbers of the order of $10^5$ were obtained. For P=3, the corresponding Hessian presents a condition number of the order of $10^{21}$. Regularization can be used without correspondence to a value of $\sigma_e^2 R_w^{-1}$, however, it can be verified that it still increases with the order of the ICI model.

There is a fundamental difference between the structure of the channel estimator in a static channel scenario and the one that arises when the Doppler effect is present. In the static case, orthogonality of data and pilots in the transmitted vector implies that $U_0^* R_n^{-1} = \sigma_v^{-2} U_0^*$. This condition minimizes the Cramer-Rao bound on the static channel estimation, assuming that the data vector convolved with the channel to act as a nuisance parameter. As a result, channel and symbol estimates are decoupled and equation reduces to the least-squares estimator $\hat{w}_0 = (\sigma_v^2 R_w^{-1} + U_0^* U_0)^{-1} U_0^* y'$. However, in the presence of ICI, this result no longer holds and the estimator will incorporate a matrix multiplication that is not suitable for implementation.

Figure 3:
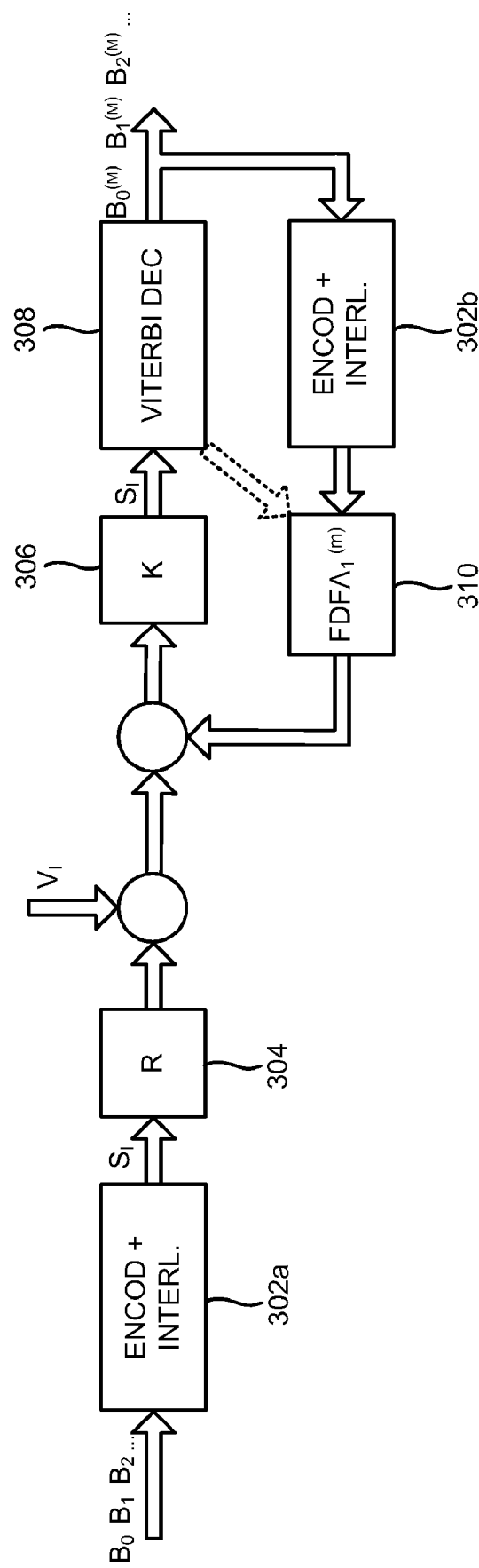
FIG. 3 illustrates a block diagram of the m-th iteration of a decision directed removal according to an embodiment herein.

FIG. 3 illustrates a block diagram of the m-th iteration of a decision directed removal having a encoder and interleaving block 302, a R block 304, a K block 306, a Viterbi decoder block 308, and a FDF Lambda block (read as FDF Lambda hat) 310 according to an embodiment herein. Bits $B_0$, $B_1$, $B_2$ ... are input into the encoder and interleaving block 302a, which includes an inner bit interleaving, a puncturing coding, and an inner symbol interleaving process. The R block 304 is an ICI model of equation (9). The K block 306 represents the estimation process. The Viterbi decoder block 308 represents a Viterbi decoder which includes the inner symbol interleaver, a soft Viterbi decoder, and an inner bit deinterleaver. After another encoding and interleaving process 302b The FDF Lambda block 310 represents the cancellation of the first order ICI term (e.g., as illustrated in FIG. 1).

Figure 4:
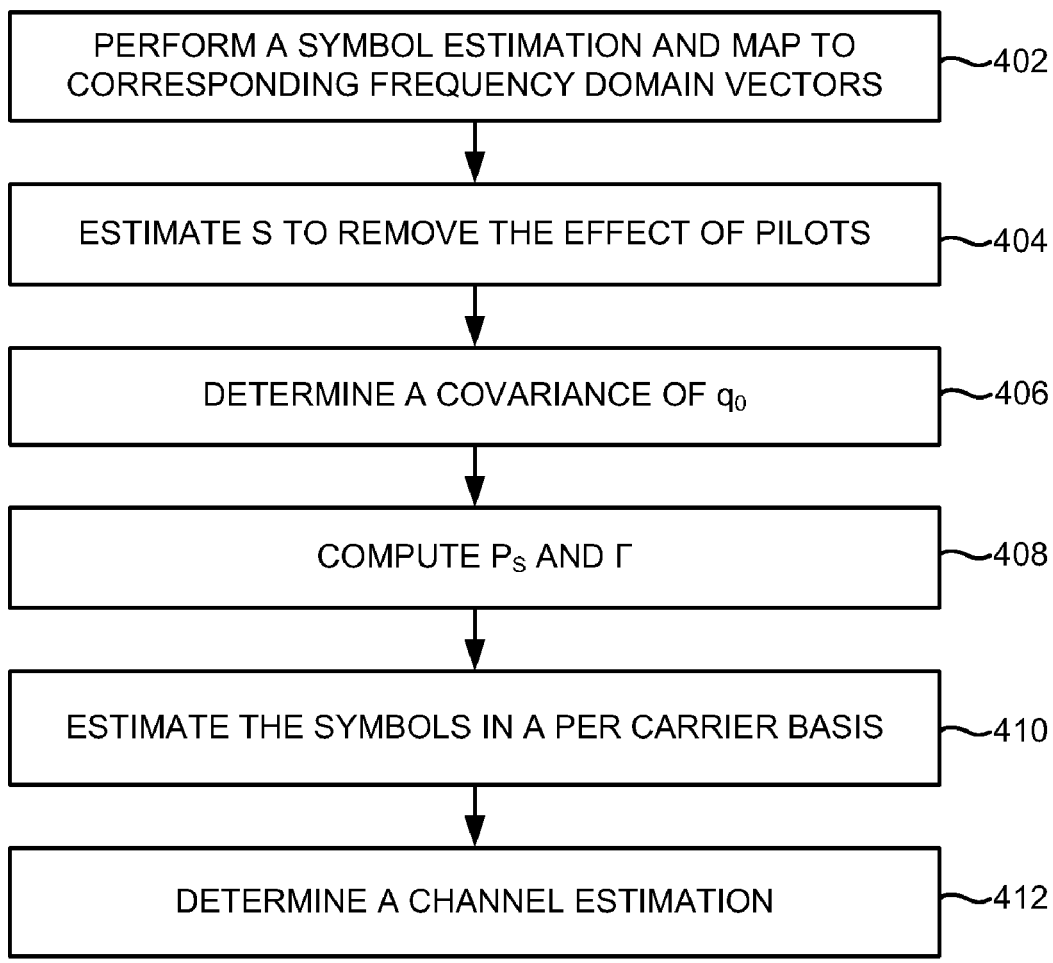
FIG. 4 illustrate a method of estimating a MMSE channel in a Decision-Directed Turbo Estimation according to an embodiment herein.

FIG. 4 illustrates a method of estimating a MMSE channel in a Decision-Directed Turbo Estimation according to an embodiment herein. In step 402, a symbol estimation is performed by first zero mapping the estimated time domain channel parameters $\hat{h}_0$ and $\hat{h}_1$ and further mapping them to their corresponding frequency domain vectors as:

$$\hat{\lambda}_p = \sqrt{M} F \begin{bmatrix} \hat{h}_p \\ 0 \end{bmatrix}, \text{ so that } \hat{\Lambda}_p = \text{diag}(\hat{\lambda}_p), p=0,1. \quad (6)$$

where diag(·) is the operator that maps a vector into a diagonal matrix and vice-versa. Let $\tilde{h}_0$ and $\tilde{h}_1$ denote the estimation errors corresponding to the estimation of $h_0$ and $h_1$, and the respective convolution matrices be $\tilde{H}_0$ and $\tilde{H}_1$. In step 404, s is estimated to remove the effect of pilots by centering the model since pilots are known quantities, and it is given by:

$$y' - (\hat{\Lambda}_0 + FDF^* \hat{\Lambda}_1) t = (\hat{\Lambda}_0 + FDF^* \hat{\Lambda}_1) s + q_0, \quad (7)$$

where $q_0 \stackrel{\Delta}{=} (\tilde{\Lambda}_0 + FDF^* \tilde{\Lambda}_1) s + (\tilde{\Lambda}_0 + FDF^* \tilde{\Lambda}_1) t + v'$ is the effective noise term at the first iteration of the turbo estimation procedure and $$\hat{\Lambda}_p = \sqrt{M} \text{ diag}\left(F \begin{bmatrix} \tilde{h}_i \\ 0 \end{bmatrix}\right), p=0,1.$$

In step 406, the covariance of $q_0$ is determined and given by:

$$R_q^{(0)} = M\sigma_s^2 (\Phi_{00}^{(0)} + FDF^* \Phi_{10}^{(0)} + \Phi_{01}^{(0)} FDF^* + FDF^* \Phi_{11}^{(0)} FDF) + U_0 P_0 U_0^* - 2\sigma_v^2 Re [U_0 P_0 U_0^* R_n^{-1}] + \sigma_v^2 I, \quad (8)$$

where $\Phi_{pq}^{(0)} \stackrel{\Delta}{=} \text{extrc}_s(F[P_0]_{pq} F^*)$, p,q=0,1 denotes the operator that retains the diagonal elements of the argument corresponding to data indexes, while setting to zero the elements corresponding to pilot indexes.

From the above, two receivers can be envisioned, a block linear MMSE and a block MMSE Decision Feedback Equalizer (DFE) receiver. In general, both criteria require an extremely high amount of complexity to be implemented in practice. In step 408, the $P_s = (R_{q_s}^{(0)} + \Gamma R_s \Gamma^*)^{-1}$, where:

$$\Gamma = (\hat{\Lambda}_0 + FDF^* \hat{\Lambda}_1), \quad (9)$$

are computed formerly and the latter due to an additional computation of the Cholesky factors of $P_s$. This also relies on the computation of the covariance $R_{q_s}^{(0)}$.

This concept of decision feedback is useful when the detected symbols are correct, or within an error margin that allows for further detected symbols to recover from errors, instead of propagating them. Even though an exact linear or decision feedback estimation is not possible due to computational impairments, the ICI effect can be approximately generated not only through the pilots as in the term $(\hat{\Lambda}_0 + FDF^* \hat{\Lambda}_1)$ t in Eq. (7), but also through the current symbol estimate. That is, one can use the entire symbol $x_m = t + s^{(m-1)}$ in order to further remove the ICI portion in a decision-directed manner. This can be achieved in two ways: (i) by relying on the detected symbols at the slicer output; (ii) by re-encoding the actual detected bits at the decoder output (as shown in FIG. 3).

This is justified by recalling that channel coding that allows for further gains in the detection of the actual transmitted bits. Thus by replacing Eq. 7 by the following centered model:

$$y' - (\hat{\Lambda}_0^{(m)} + FDF^*\hat{\Lambda}_1^{(m)})t - FDF^*\hat{\Lambda}_1 s^{(m-1)} = \hat{\Lambda}_0 s^{(m)} + q_m \quad (10)$$

During the first symbol estimation, the ICI can only be reconstructed through the pilot vector. Moreover, the covariance of $q_0$ is a full matrix, and a simplified per carrier approximation must be pursued. In step 310, the symbols in a per carrier basis is estimated by considering only the diagonal terms of the full matrices involved in the estimation, defining $\overline{\Lambda}_m \triangleq [\hat{\Lambda}_0^{(m)}]_{dataindex}$ and $\overline{\Sigma}_m = [\text{diag}(R_{q_s}^{(m)})]_{dataindex}$, and is given by:

$$z_m = [y_i - \hat{\Lambda}_0^{(m)} t - FDF^*\hat{\Lambda}_1^{(m)} x_m]_{dataindex}$$

$$\check{s}_d^{(m)} = (\sigma_s^{-2} I + \overline{\Lambda}_m^* \overline{\Sigma}_m^{-1} \overline{\Lambda}_m)^{-1} \overline{\Lambda}_1^* \overline{\Sigma}_m^{-1} z_m. \quad (11)$$

The number of iterations in this turbo estimation scheme will depend on the precision as well as on the computational complexity that can be afforded by the hardware. Moreover, assuming that the channel estimation errors after the first iteration are small, the effective noise in the model by the channel noise can be approximated. In fact, a more practical solution is to take into consideration other noise sources, such as quantization, model imperfection, etc. In this case, a recursive estimate of the total noise power can be pursued. Upon symbol recovery, re-estimating the channel can be continued, assuming that a correct symbol decision has been made, and proceed using the entire vector of symbols for training. In one embodiment, training refers to channel estimation. Once the input is transmitted through the channel, the channel is estimated. Only a part of input vector contains training symbols (pilots). The channel estimated is based only on a partial knowledge of the entire transmitted vector. After the symbol is recovered, a better channel is estimated by using an entire vector of transmitted symbols (pilots used at the first iteration and new estimated symbols).

Let $s^{(m-1)}$ denote the improved data vector estimate obtained from $\check{s}_d^{(m-1)}$ at the (m−1)-th iteration of a turbo estimation scheme (the former includes zero valued carriers and DC shifting), and define a rough estimate for the transmitted vector by $x_m = t + s^{(m-1)}$, as well as the diagonal matrix $\Delta_{x_m} = \text{diag}(x_m)$. Then, using $x_m$ to estimate the channel, the effective noise n in the model is given approximately by the channel noise, with $R_n = \sigma_v^2 I$. In step 312, for the given channel $\hat{w}_{m-1}$ (that is, its rough estimate), an a new channel $\hat{w}_m$ is estimated and expressed as:

$$\hat{w}_m = \hat{m}_{m-1} + (\sigma_v^2 P_{m-1}^{-1} + U_m^* U_m)^{-1} U_m^* (y - U_m \hat{w}_{m-1}) \quad (12)$$

where $$U_m = \sqrt{M} [\Delta_{x_m} \overline{F} \ FDF^* \Delta_{x_m} \overline{F}].$$

Using $P_{m-1}^{-1}$ as the MMSE of the previous iteration implicitly assumes a model for the channel, which may be unreliable. In addition, a high estimation error implies that the regularization is small. This can induce an ill-conditioned solution to the estimation problem. Because the technique in based on feedback of assumed correct detections, a more reasonable approach is to assume the error covariance (note that updating $P_m$ also implies additional computational complexity). Hence, a fixed regularization $P_{m-1} = R_w^{-1}$ is considered, which can be viewed as a blockwise version of an $\epsilon$-normalized least mean square (NLMS), where E is replaced by $\sigma_v^2 R_w^{-1}$.

Figure 5A:
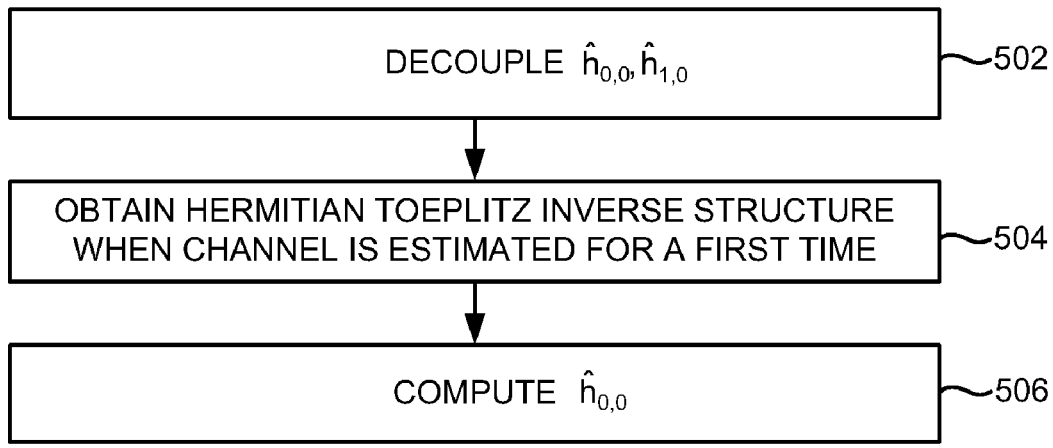
FIG. 5A illustrates a flow diagram of method of channel estimation via a fast algorithm according to an embodiment herein.

FIG. 5A illustrates a flow diagram of method of channel estimation via a fast algorithms, according to an embodiment herein. The numerical and computational impairments that arise in the exact estimation of $w_m$ are may be difficult as compared to the standard static channel OFDM scheme. This is mostly due to the full structure of $U_m^* U_m$. It can be verified, however, that the contribution of the off block diagonals are negligible when compared to the main blocks. Moreover, with respect to the (1,1) block (of size N×N), the effect of the diagonal is dominant. The estimation of the channel is assumed for the first time, so that $\Delta_{x_m} = \Delta_t$, and that the channel length is upper bounded by $N_{max}$.

For instance, in a TU-6 model, the cyclic prefix M/4 can be approximately 10 times longer than the actual channel spread, which implicitly assumes that $N_{max} = M/4$. In step 502, $U_m^* U_m$ is assumed as a block diagonal and the $\{\hat{h}_{0,0}, \hat{h}_{1,0}\}$ are decoupled.

$$\hat{h}_{0,0} = \underbrace{\sqrt{M} (\sigma_n^2 \sigma_{h_0}^{-2} I + M \overline{F}^* \Delta_t^* \Delta_t \overline{F})^{-1} \overline{F}^* \Delta_t^* y'}_{\triangleq [P_0]_{00}} \quad (13)$$

$$\hat{h}_{1,0} = (1/\alpha) \overline{F}^* \Delta_t^* FDF^* y',$$

where $$\alpha = \frac{\sigma_n^2 \sigma_{h_1}^{-2}}{\sqrt{M}} + \sqrt{M} \|DF^* t\|^2.$$

Because $[P_0]_{00}^{-1}$ defined above has a Hermitian Toeplitz structure, several fast algorithms are available for its inversion. In step 504, for the first time, the channel is estimated, $[P_0^{-1}]_{00}$ (Hermitian Toeplitz Inverse structure) is obtained and can be expressed as $$[P_0]_{00} = \frac{1}{p_{0,0}(\phi - \psi)} D_\psi^* F_{N_{max}}^* \begin{bmatrix} \Lambda_{\psi, p_0} F_{N_{max}}^* D_\psi F_{N_{max}}^* \Lambda_{\phi, \overline{z} \overline{p}_0} - \\ \Lambda_{\psi, z p_0} F_{N_{max}} D_\psi F_{N_{max}}^* \Lambda_{\phi, p_0} \end{bmatrix} F_{N_{max}}, \quad (14)$$

where $\{D_\psi^*, \Lambda_{\psi, P_0}, \Lambda_{\phi, \overline{z} \overline{P}_0}\}$ are known diagonal matrices. In step 506, $\hat{h}_{0,0}$ is computed. The complexity of computing $\hat{h}_{0,0}$, amounts to six Fast Fourier Transforms (FFTs) of size Nmax and one pruned FFT of size M. For $\hat{h}_{1,0}$, it requires one FFT of size $N_{max}$ and two pruned FFTs of size M.

In DVB applications, only four different pilot vectors need to be stored since the slanting structure embedded in part of the pilots repeats itself at every four blocks. The total storage required amounts to $8N_{max}$. Now, for subsequent re-estimations, the zero tap detection algorithm can be applied to the first estimation of $\hat{h}_{0,0}$. In this way, for sparse channels, new estimates can be efficiently obtained based on a considerably reduced set of parameters. For instance, a TU-6 model will require only twelve useful tap estimates, whose locations are obtained from the first estimation of $h_0$.

Figure 5B:
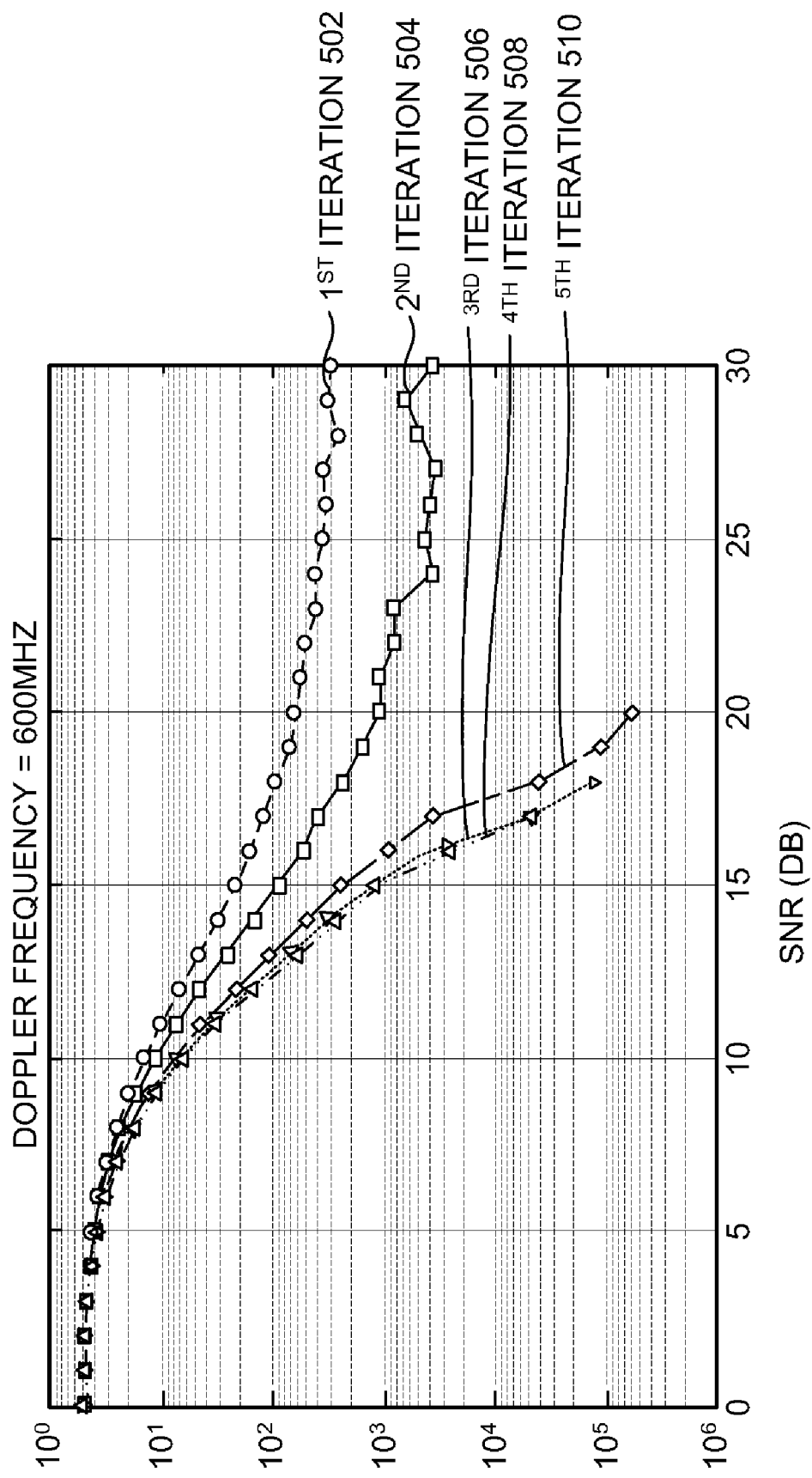
FIG. 5B illustrates a graphical representation of a bit level turbo estimation for $f_d$ according to an embodiment herein.

FIG. 5B illustrates a graphical representation of bit level turbo estimation for $f_d = 600$ Hz. In one embodiment, for a 2K mode (M=2048), under the following setting: the cyclic prefix: M/4, a constellation size: 16 QAM, a sampling frequency $f_s = 64/7 \times 10^6$ Hz, a carrier frequency: a $f_c = 8 \times 10^8$ Hz, Number of OFDM symbols: 512, a convolutional encoder rate: R=1/2, and the Doppler frequency: 600 Hz, the setup translates the underlying Rayleigh fading TU-6 model into a 46 tap time varying finite-implulse-response (FIR) channel. Considering the decision-directed scheme where the detected data bits are re-encoded in order to reconstruct and subtract the ICI term from the received signal (e.g., as shown in FIG. 3B). For simplicity of implementation, and assuming that in practice the effective noise level can be recursively estimated, the latter is assumed to be fixed for all subcarriers, and equal to 1. FIG. 5B shows the BER from 0 to 4 channel re-estimations. After 3 iterations (e.g., a $1^{st}$ iteration 502, a $2^{nd}$ iteration 504 and a $3^{rd}$ iteration 506), it is observed that, no significant gain is obtained from this scheme (e.g., from $4^{th}$ iteration 508 and $5^{th}$ iteration 510.

Figure 6:
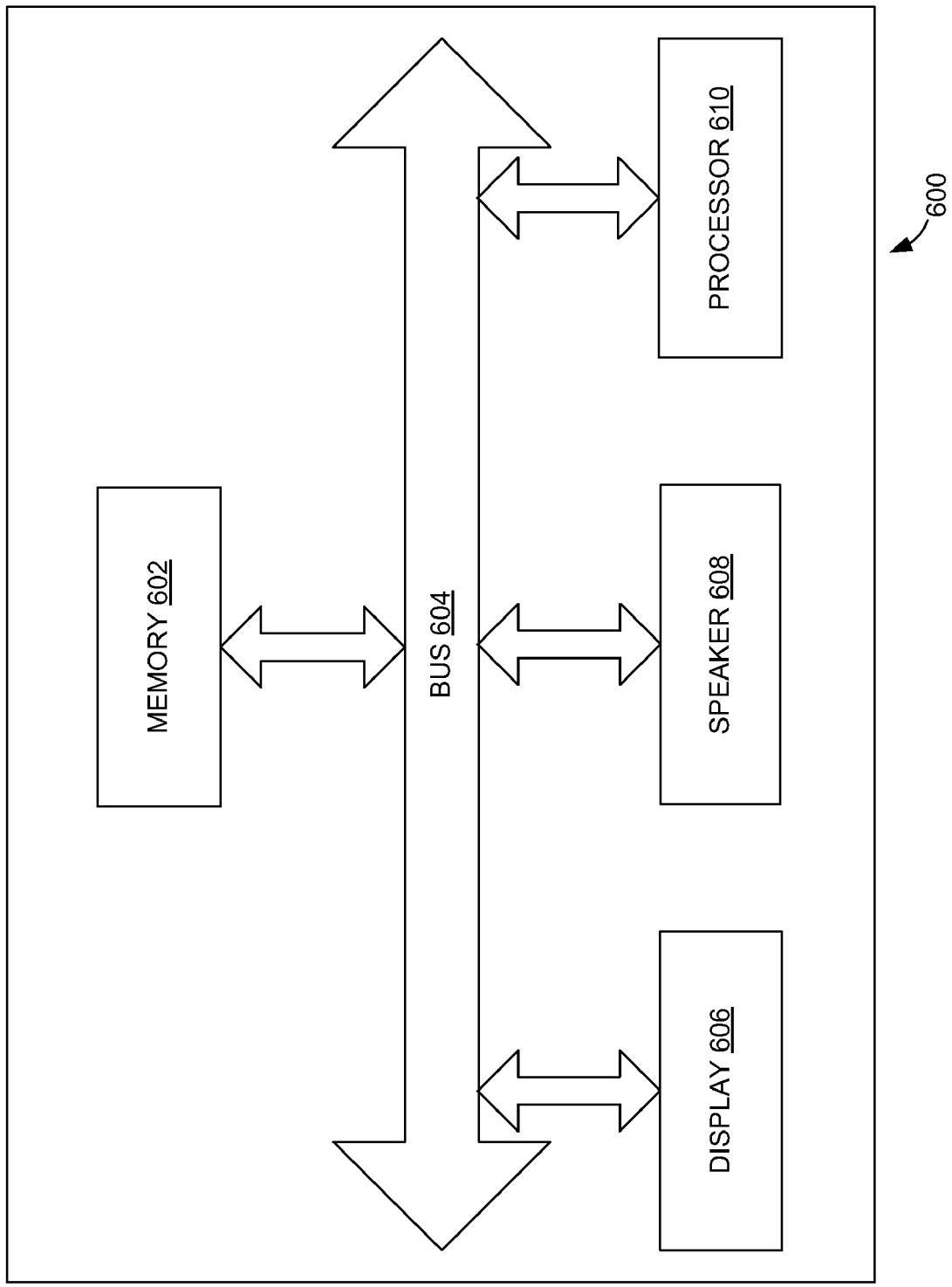
FIG. 6 illustrates an exploded view of a receiver according to an embodiment herein.

FIG. 6 illustrates an exploded view of a receiver 600 having an a memory 602 having a computer set of instructions, a bus 604, a display 606, a speaker 608, and a processor 610 capable of processing a set of instructions to perform any one or more of the methodologies herein, according to an embodiment herein. The processor 610 may also enable digital content to be consumed in the form of video for output via one or more displays 606 or audio for output via speaker and/or earphones 608. The processor 610 may also carry out the methods described herein and in accordance with the embodiments herein. Digital content may also be stored in the memory 602 for future processing or consumption. The memory 602 may also store program specific information and/or service information (PSI/SI), including information about digital content (e.g., the detected information bits) available in the future or stored from the past.

A user of the receiver 600 may view this stored information on display 606 and select an item of for viewing, listening, or other uses via input 600, which may take the form of keypad, scroll, or other input device(s) or combinations thereof. When digital content is selected, the processor 610 may pass information. The content and PSI/SI may be passed among functions within the receiver 600 using bus 604.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
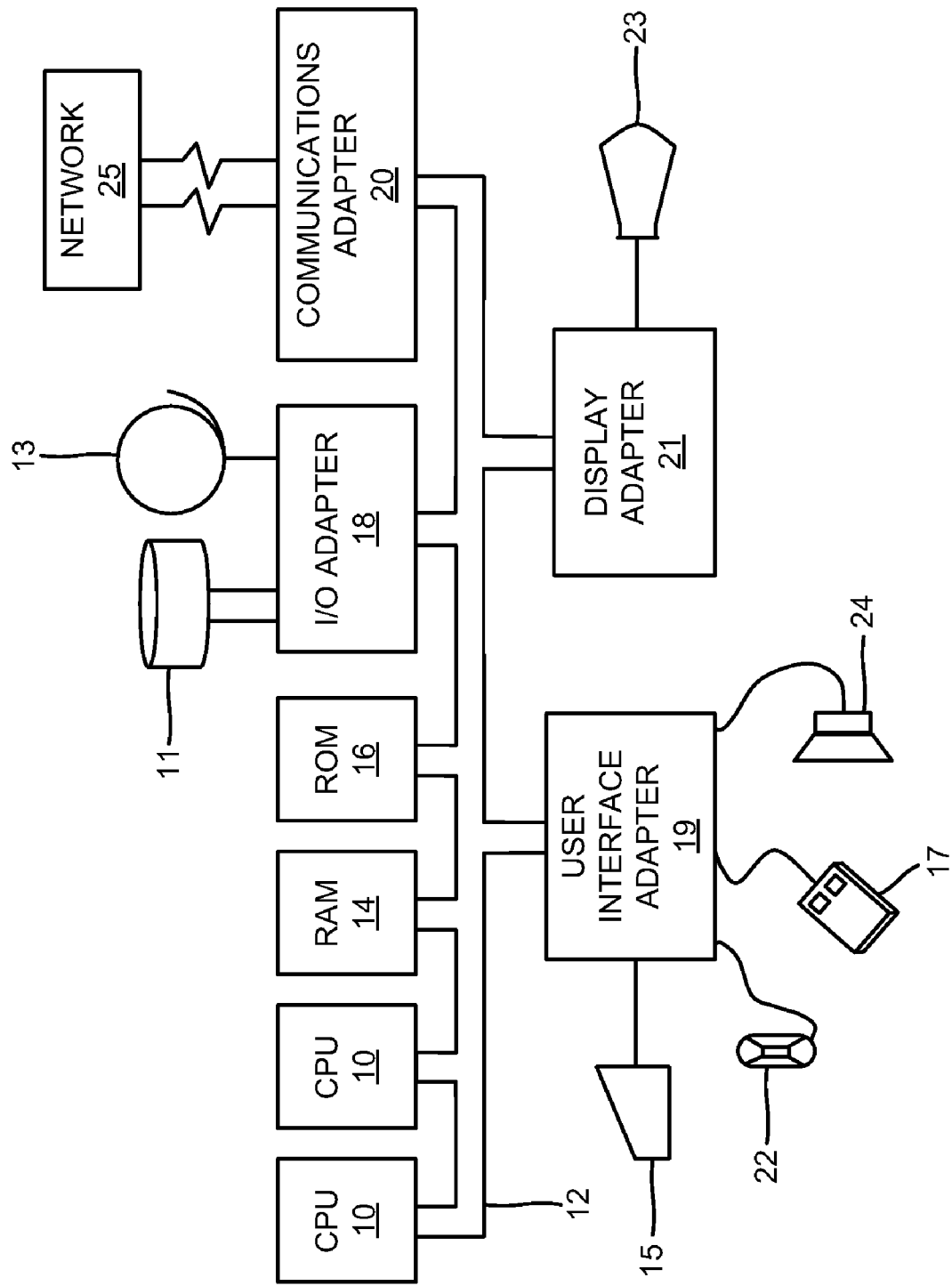
FIG. 7 illustrates a schematic diagram of a computer architecture used in accordance with the embodiments herein.

A representative hardware environment for practicing the embodiments herein is depicted in FIG. 7. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 8A:
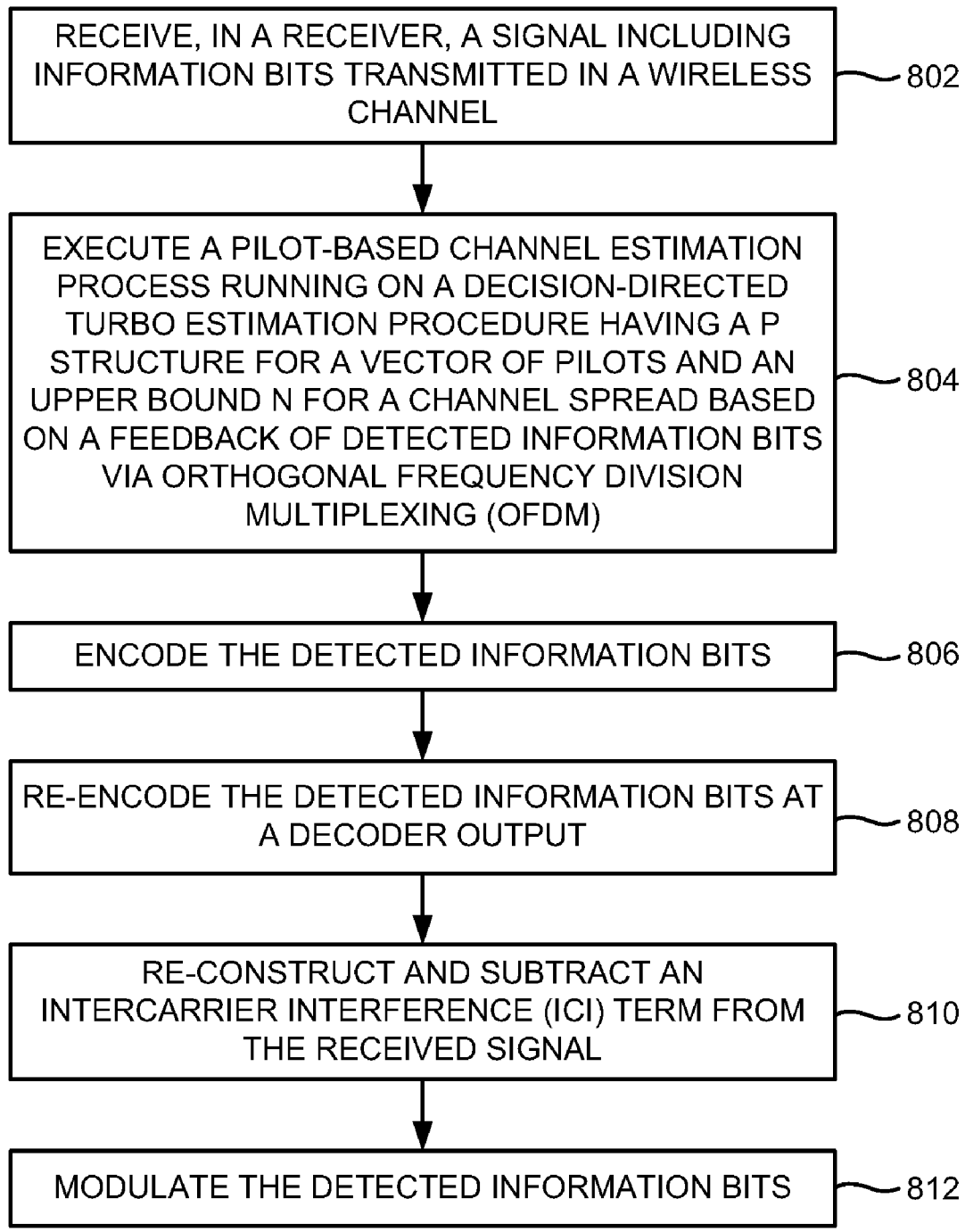
FIGS. 8A and 8B illustrate flow diagrams of a method of applying a fast algorithm to a pilot-based channel estimation process according to an embodiment herein.
Figure 8B:
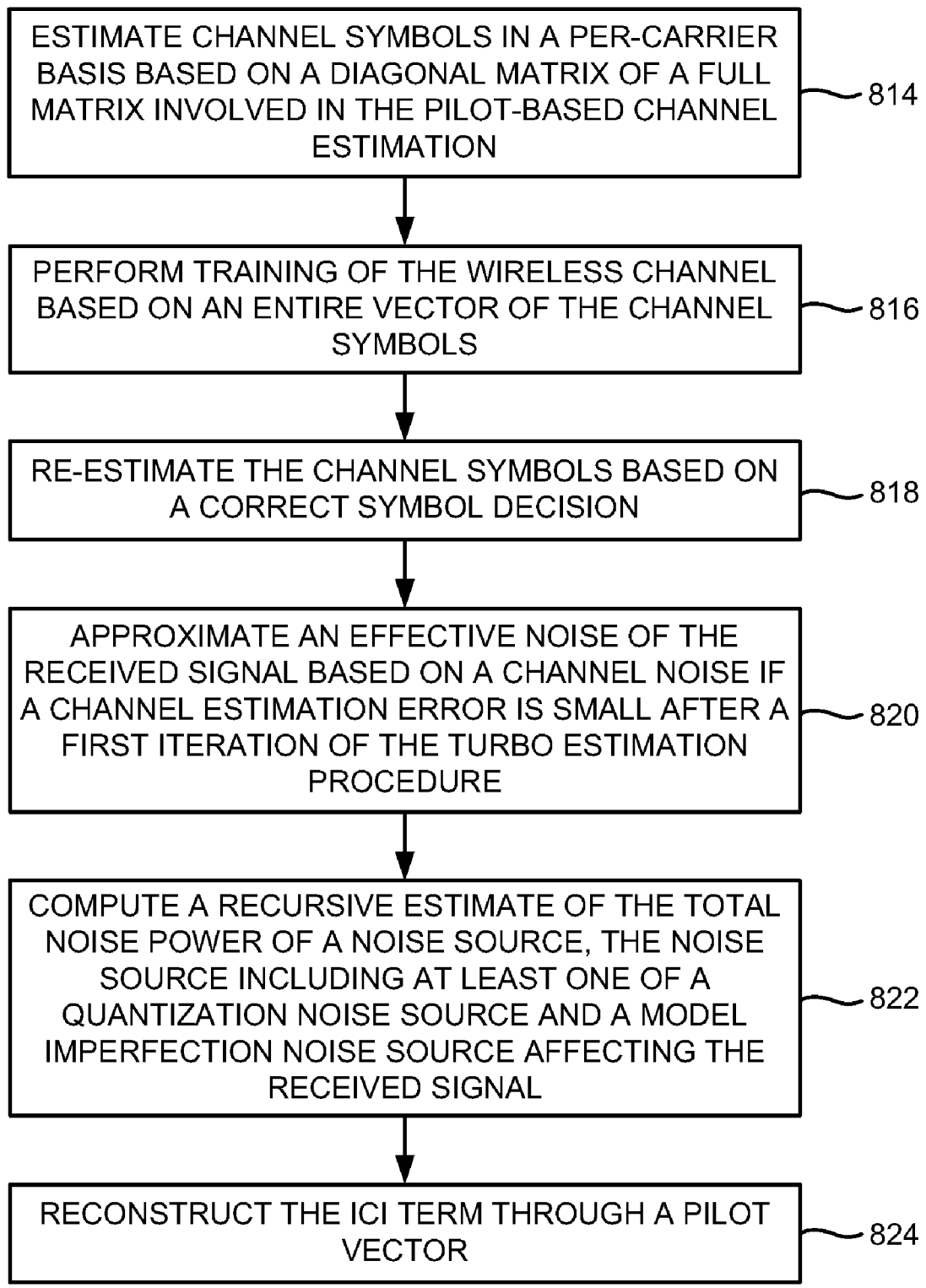

FIGS. 8A through 8B, with reference to FIGS. 1 through 7, illustrate flow diagrams of a method of applying a fast algorithm to a pilot-based channel estimation process according to an embodiment herein. In step 802, a signal comprising information bits $B_0$, $B_1$, $B_2$ . . . transmitted in a wireless channel is received in a receiver 600, which may be embodied as a block linear MMSE or a block MMSE DFE receiver. In step 804, a pilot-based channel estimation process running on a decision-directed turbo estimation procedure having a p structure for a vector of pilots and an upper bound N for a channel spread based on a feedback of detected information bits is executed via OFDM. In step 806, the detected information bits $B_0$, $B_1$, $B_2$ . . . are encoded 302a. In step 808, the detected information bits are re-encoded 302b at a decoder output 308. In step 810, an ICI term is re-constructed and subtracted from the received signal. In step 812, the detected information bits are modulated.

In step 814, channel symbols are estimated in a per-carrier basis based on a diagonal matrix of a full matrix involved in the pilot-based channel estimation. In step 816, training of the wireless channel is performed based on an entire vector of the channel symbols. In step 818, the channel symbols may be re-estimated based on a correct symbol decision. In step 820, an effective noise of the received signal may be approximated based on a channel noise if a channel estimation error is small after a first iteration of the turbo estimation procedure. In step 822, a recursive estimate of the total noise power of a noise source may be computed, the noise source comprising at least one of a quantization noise source and a model imperfection noise source affecting the received signal. In step 824, the ICI term may be re-constructed through a pilot vector.

The embodiments herein provide a method of applying a fast algorithm to a pilot-based channel estimation scheme running on a decision-directed turbo estimation and can be implemented in Digital Video Broadcasting for Handheld devices (DVB-H) and baseband chip sets supports standards which include DVB-H/ISDB-T/DMB/MediaFlo, etc.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of applying a fast algorithm to a channel estimation process, said method comprising:
    receiving, in a receiver, a signal comprising information bits transmitted in a wireless channel;
    executing a pilot-based channel estimation process running on a decision-directed turbo estimation procedure having a p structure for a vector of pilots and an upper bound N for a channel spread based on a feedback of detected information bits via Orthogonal Frequency Division Multiplexing (OFDM), wherein said p and said N are integers;
    encoding said detected information bits;
    re-encoding said detected information bits at a decoder output after the encoding occurs;
    re-constructing and subtracting an intercarrier interference (ICI) term from said received signal;
    modulating said detected information bits after the re-encoding and the re-constructing and subtracting occurs;
    estimating channel symbols in a per-carrier basis based on a diagonal matrix of a full matrix involved in said pilot-based channel estimation; and
    performing training of said wireless channel based on an entire vector of said channel symbols.

2. The method of claim 1, further comprising re-estimating said channel symbols based on a correct symbol decision.

3. The method of claim 2, further comprising approximating an effective noise of said received signal based on a channel noise if a channel estimation error is small after a first iteration of said turbo estimation procedure.

4. The method of claim 3, further comprising computing a recursive estimate of the total noise power of a noise source, said noise source comprising at least one of a quantization noise source and a model imperfection noise source affecting said received signal.

5. The method of claim 3, wherein said first iteration of said turbo estimation procedure and said effective noise of said received signal are based on said channel noise.

6. The method of claim 1, further comprising reconstructing said ICI term through a pilot vector.

7. The method of claim 1, wherein said receiver comprises any of a block linear minimum mean-square-error (MMSE) and a block MMSE Decision Feedback Equalizer (DFE) receiver.

8. A non-transitory program storage device readable by computer, tangibly embodying a program of instructions executable by said computer to perform a method of applying a fast algorithm to a channel estimation process, said method comprising:
    receiving, in a receiver, a signal comprising information bits transmitted in a wireless channel;
    executing a pilot-based channel estimation process running on a decision-directed turbo estimation procedure having a p structure for a vector of pilots and an upper bound N for a channel spread based on a feedback of detected information bits via Orthogonal Frequency Division Multiplexing (OFDM), wherein said p and said N are integers;
    encoding said detected information bits;
    re-encoding said detected information bits at a decoder output after the encoding occurs;
    re-constructing and subtracting an intercarrier interference (ICI) term from said received signal;
    modulating said detected information bits after the re-encoding and the re-constructing and subtracting occurs;
    estimating channel symbols in a per-carrier basis based on a diagonal matrix of a full matrix involved in said pilot-based channel estimation; and
    performing training of said wireless channel based on an entire vector of said channel symbols.

9. The program storage device of claim 8, wherein said method further comprises re-estimating said channel symbols based on a correct symbol decision.

10. The program storage device of claim 9, wherein said method further comprises approximating an effective noise of said received signal based on a channel noise if a channel estimation error is small after a first iteration of said turbo estimation procedure.

11. The program storage device of claim 10, wherein said method further comprises computing a recursive estimate of the total noise power of a noise source, said noise source comprising at least one of a quantization noise source and a model imperfection noise source affecting said received signal.

12. The program storage device of claim 10, wherein said first iteration of said turbo estimation procedure and said effective noise of said received signal are based on said channel noise.

13. The program storage device of claim 8, wherein said method further comprises reconstructing said ICI term through a pilot vector.

14. The program storage device of claim 8, wherein said receiver comprises any of a block linear minimum mean-square-error (MMSE) and a block MMSE Decision Feedback Equalizer (DFE) receiver.

15. An apparatus for applying a fast algorithm to a channel estimation process, said apparatus comprising:
- a receiver that receives a signal comprising information bits transmitted in a wireless channel;
- a memory unit operatively connected to said receiver and comprising a programmable set of instructions;
- a display unit operatively connected to said memory unit;
- a processor that executes said set of instructions, wherein said processor executes a pilot- based channel estimation process running on a decision-directed turbo estimation procedure having a p structure for a vector of pilots and an upper bound N for a channel spread based on a feedback of detected information bits via Orthogonal Frequency Division Multiplexing (OFDM), wherein said p and said N are integers;
- a Viterbi decoder operatively connected to said processor;
- an encoder that encodes said detected information bits and re-encodes, after the encoding occurs, said detected information bits at an output of said Viterbi decoder; and
- a modulator that modulates said detected information bits;
- wherein said processor (i) re-constructs and subtracts an intercarrier interference (ICI) term from said received signal; (ii) estimates channel symbols in a per-carrier basis based on a diagonal matrix of a full matrix involved in said pilot-based channel estimation; and (iii) performs training of said wireless channel based on an entire vector of said channel symbols, and
- wherein said modulator modulates said detected information bits after the re-encoding and the re-constructing and subtracting occurs.

16. The apparatus of claim 15, wherein said processor re-estimates said channel symbols based on a correct symbol decision; and approximating an effective noise of said received signal based on a channel noise if a channel estimation error is small after a first iteration of said turbo estimation procedure.

17. The apparatus of claim 16, wherein said processor computes a recursive estimate of the total noise power of a noise source, said noise source comprising at least one of a quantization noise source and a model imperfection noise source affecting said received signal.

18. The apparatus of claim 16, wherein said first iteration of said turbo estimation procedure and said effective noise of said received signal are based on said channel noise.

19. The apparatus of claim 15, wherein said processor reconstructs said ICI term through a pilot vector.

20. The apparatus of claim 15, wherein said receiver comprises any of a block linear minimum mean-square-error (MMSE) and a block MMSE Decision Feedback Equalizer (DFE) receiver.

* * * * *